G. W. CISCO & J. E. HALL.
ENSILAGE TAMPING DEVICE FOR SILOS.
APPLICATION FILED FEB. 5, 1916.

1,214,896.

Patented Feb. 6, 1917.
2 SHEETS—SHEET 2.

Inventors,
G. W. Cisco, and
J. E. Hall, by
G. C. Kennedy,
Attorney.

UNITED STATES PATENT OFFICE.

GEORGE WILLARD CISCO AND JOHN EDWARD HALL, OF FREMONT TOWNSHIP, BUTLER COUNTY, IOWA.

ENSILAGE-TAMPING DEVICE FOR SILOS.

1,214,896.     Specification of Letters Patent.     Patented Feb. 6, 1917.

Application filed February 5, 1916. Serial No. 76,361.

*To all whom it may concern:*

Be it known that we, GEORGE WILLARD CISCO and JOHN EDWARD HALL, citizens of the United States of America, and residents of Fremont township, Butler county, Iowa, have invented certain new and useful Improvements in Ensilage-Tamping Devices for Silos, of which the following is a specification.

Our invention relates to improvements in ensilage tamping devices for silos, and the object of our improvements is to provide mechanism adapted to tamp and compress the contents while in a loose condition after filling.

This object we have accomplished by the mechanism which is hereinafter described and claimed, and which is illustrated in the accompanying drawings, in which:

Fig. 3 is a detail side elevation of the power transmission means for said tamping mechanism.

Similar numerals of reference denote corresponding parts throughout the several views.

Ensilage, when cut and delivered into a silo, is in a very loose and lightly disseminated state, and usually a considerable time elapses before it settles under the action of gravity, to become of a comparatively compact condition. When so settled, it is obvious that the silo, previously completely filled with the loose material, becomes empty at a considerable extent of its top portion, entailing a waste of space. Then, again, the ensilage which lies abutting upon the inner wall of the silo, is even under the above condition, after natural settling, quite loose and permeable to moisture which may intrude from without through the joints of the silo, so that often a large proportion of the contents is spoiled, or at least much deteriorated.

It is our purpose to obviate these losses and inconveniences, and by means for tamping and compressing the ensilage which shall be effectual. Furthermore, the use of our improved mechanism will result in an economy of labor, as will become manifest by the following description of the machine.

Figure 1:
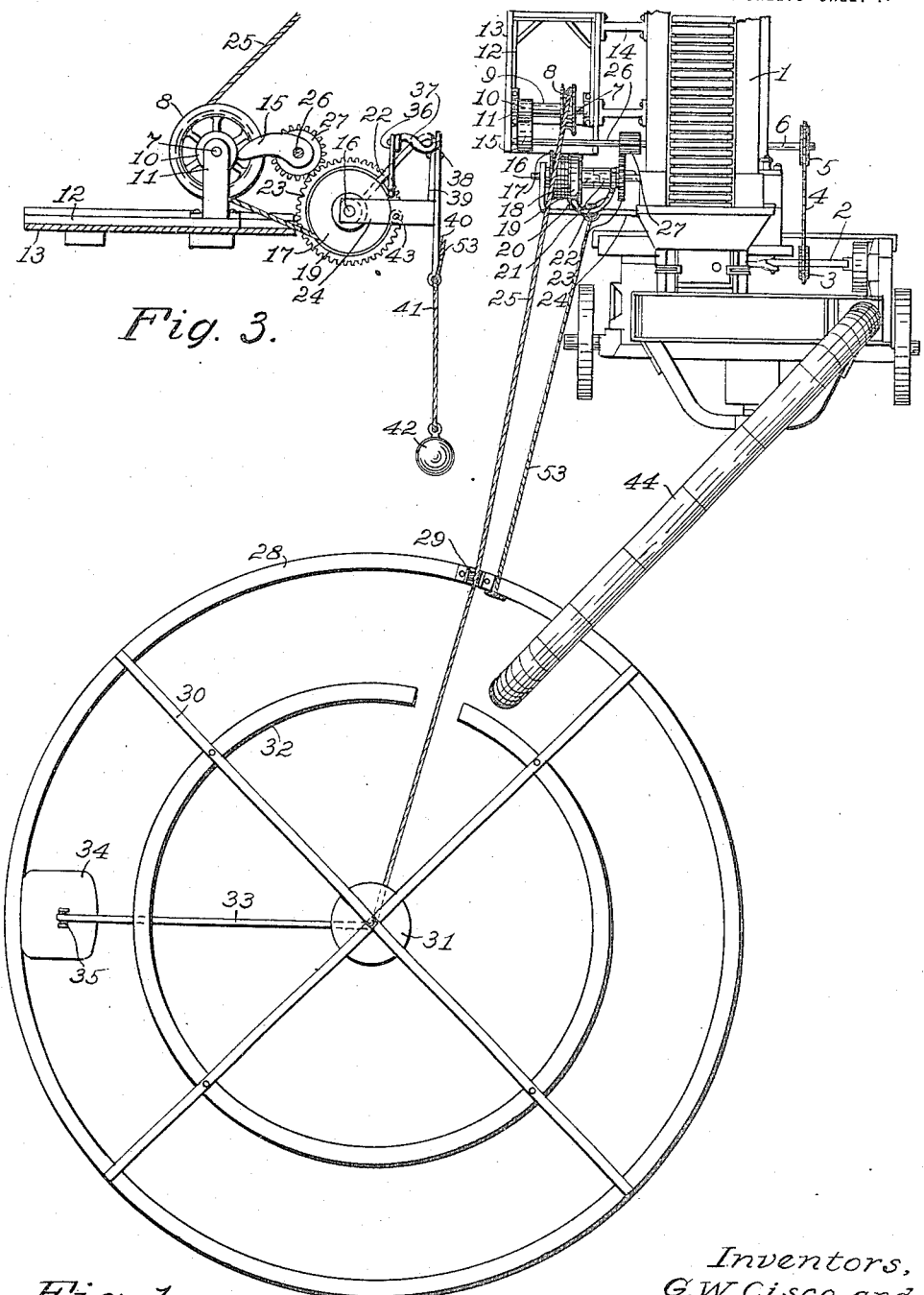
Figure 1 is a plan view of a silo and of our improved tamping mechanism therefor as operatively connected to an ensilage cutter and carrier, part of said cutter being broken away.

Referring first to Fig. 1, 1 is an ensilage cutter having the usual spout 44 to deliver cut ensilage into the top of a silo 28. The power-shaft 2 has a sprocket-wheel 3, a driven-shaft 6 has a sprocket-wheel 5, and a sprocket-chain 4 operatively connects said wheels.

On the opposite side of the ensilage-cutter is a frame-work 13 bracketed on arms 14, and having a bearing for the opposite end of said shaft 6. The shaft 6 has fixed thereon a relatively wide pinion 27 and a cam-wiper 15.

Mounted slidably longitudinally in slideways on the frame-work 13 is a slide-body 12 having spaced bearings 11 in which is mounted a shaft 7, and an integrally-connected wheel 10 and sheave 8 are rotatably mounted on said shaft.

The cam-wiper 15 is in line with and adapted when rotated to intermittently contact with said wheel or roller 10, and in doing so, pushes it and the slide-body 12 along the slideway.

A bracket 24 is mounted on said ensilage-cutter near the framework 13 and in it is rotatably mounted a shaft 16, parallel with said other shafts. On the shaft 16 is mounted at its outer end a rotatable non-slidable winding-drum 17, to which is secured an end of a cable 25 to be wound thereabout and then passed under and upwardly about the sheave 8, being thence carried upwardly obliquely over a roller 29 on the upper edge of the silo 28.

The right-hand part of said drum 17 is formed into a widened ring or drum 18, about which is placed a band-brake 19, one end of the latter being fixed on a pin 43 in the bracket 24. The said drum has an integral hub 20 having its end formed into a clutch-member, and another hub 21 is slidably non-rotatably mounted over a spline 50 in said shaft 16, and provided with a mating clutch-face for the clutch-face on the other hub 20. The hub 21 has an integral gear-wheel 23 which meshes with the pinion 27, and being narrower, may slide along the latter without becoming unmeshed. The hub 21 has an annular groove adapted to movably receive a fork on a shifting-arm 22, the latter being integral with a rock-body 40 which is pivoted at 38 to a standard 39 on the bracket 24. A short piece of cable 41, with suspended weight 42, is hung from the lower depending part of the rock-body 40. Said rock-body has an oppositely-extending arm 37, having near its tip a short slot 51 to slidably receive a pin-connection 52, pivotally, from the upper end of a link 36, whose lower end is pivotally connected to the other end of the band-brake 19.

Figure 2:
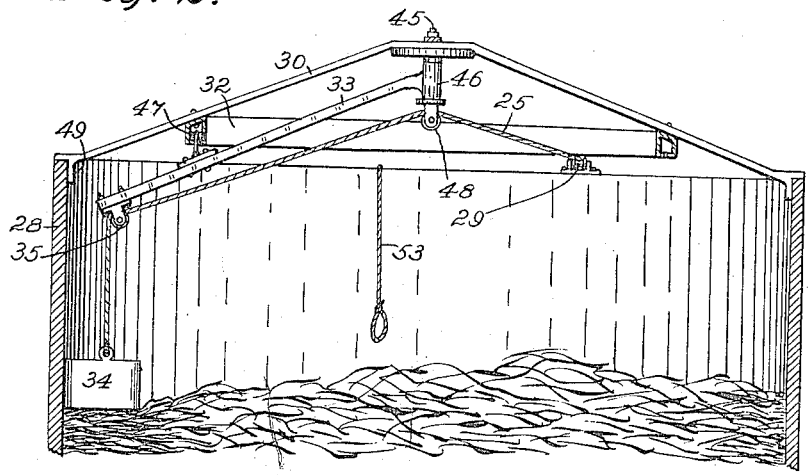
Fig. 2 is a vertical transverse section of the top part only of silo, with the tamping-means mounted therein.

Referring now to said Fig. 2, crossed arch-bars 30 are located across and spanning the top of the silo and have at their ends angular integral parts 49 which engage the inner angle of the silo edge, removably. A disk 31 reinforces the junction of said bars and is secured thereto by a bolt 45, which is relatively long, to extend downwardly and have a rock-sleeve 46 mounted thereon, said sleeve having depending lugs in which is journaled a sheave 48. An arm 33 projects fixedly from the sleeve 46, extending nearly to the inner wall of the silo, and carries at its outer end a sheave 35.

A broken annular hollow trackway 32 is supported on the arch-bars 30, opening downwardly to receive the standard of trolley-wheels 47 mounted on the arm 33. The cable 25 is carried over the sheaves 48 and 35 to carry at its end a depending weight 34, two opposite side faces of which are formed on an arc of the curvature of the inner wall of the silo.

Figure 4:
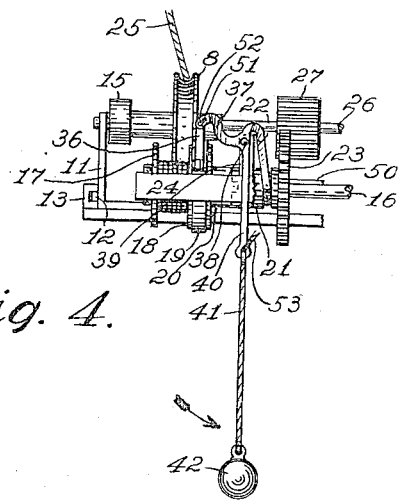
Fig. 4 is an end elevation thereof.

Operation: The weight 42 suspended from the rock-body 40 normally acts upon the arms 37 and 22 to at once keep the clutch-parts of the hubs 20 and 21 in mesh, and the band-brake 19 loose on its drum 18, thus normally keeping the tamping-mechanism in operative condition. When the weight 42 with the rock-body 40 is swung toward the left, as indicated by the arrow in said Fig. 4, the arms 37 and 22 actuate the clutch-member 21 to disconnect it from the other clutch-member, and the band-brake is at approximately the same time tightened upon the drum 18 to stop rotation of the drum 17, the slot 51 permitting some play to the pin 52, whereby the clutch 21 may become un-clutched just before the brake-band is tightened, said slot also permitting of direct up and down movement of the connected end of the brake.

The rotation of the shaft 6 effects two functions, that is the sliding of the slide-body 12 by the action of the wiper 15 on the roller 10, and the gradual winding up of the cable 25 on the winding-drum 17 by the rotation imparted to the gear-wheel 23 by the pinion 27. The tension upon the cable 25 produced by the suspended weight or tamping-head 34, causes the slide-body 12 to slide back when released by the wiper 15. The bolts securing the mounting of the sheave 35 to the arm 33, may be relocated in other bolt-holes in the arm along its length as indicated by the dots thereon, to permit of suspending the tamper 34 at any place in the silo relative to its inner wall. When the tamping-head is thus employed near the inner wall of the silo especially, it compresses the ensilage firmly, giving it such a solidity as will resist permeation of moisture through the wall.

For convenience of a person standing within the silo 28, a pull-rope 53 may be provided, one end connected to the lower end of the rock-body 40, the other end of the rope being carried over the silo top to depend therein. By this means, the man within the silo may control the action of the apparatus effectively.

Having described our invention, what we claim as new, and desire to secure by Letters Patent, is:

1. In combination, a power-shaft, a driven-shaft, a slide-body mounted to slide transversely relative to said shafts, a counter-shaft mounted on said slide-body, an integrally-connected roller and sheave mounted rotatably on said counter-shaft, a cam-wiper and a pinion mounted on said driven-shaft and said cam-wiper adapted to wipe said roller and push said slide-body in one direction, another rotary shaft, a winding-drum rotatably non-slidably mounted on the last-mentioned shaft and having a hub provided with a clutch-face, a gear-wheel slidably non-rotatably mounted on the last-mentioned shaft and in mesh with said pinion, said gear-wheel being of less width than the pinion and having a clutch-face mating with the other clutch-face, means for moving said clutch-members into or out of engagement, a cable wound on said winding-drum and carried about said sheave, and a tamping-head secured upon the free end of said cable.

2. In combination, a sheave mounted to reciprocate, means for reciprocating said sheave, a winding-drum rotatably mounted, a cable wound about said drum and carried about said sheave, a tamping-head secured on said cable, and disengageable means for rotating said drum.

3. In combination, a sheave mounted to reciprocate, means for reciprocating said sheave, a winding-drum rotatably mounted, a cable wound about said drum and carried about said sheave, a tamping-head secured to the free end of said cable, disengageable means for rotating said drum, said drum having at one end a fixed friction ring, a band-brake mounted upon said ring and means adapted to act to release the band-brake while engaging the drum with its rotating-means, and to engage the ring while disengaging said rotating-means from the drum.

4. In combination, a sheave mounted to reciprocate, means for reciprocating said sheave comprising a rotatable wiper adapted to intermittently move the sheave mounting in one direction, a winding-drum, a cable wound on said drum and carried about said sheave, a tamping-head secured on the free end of said cable, rotary shafts on which said wiper and said drum are respectively mounted, the drum having a friction ring, fixed on one end and a clutch-face, a relatively thick pinion on the wiper carrying shaft, a narrower gear-wheel on the drum carrying shaft in mesh with said pinion, said gear-wheel being slidably non-rotatably mounted on its shaft and having a mating clutch-face for the other clutch-face, the drum being rotatably non-slidably mounted on said shaft, a band-brake mounted about said friction ring, and a rock-body movably connected to both said band-brake and said gear carrying clutch-member, and adapted when in one position to release said band-brake and engage said clutch-members, and when in another position to engage said band-brake and disengage said clutch-members.

5. In combination, removable supporting-means mounted on a silo-top, an arm swingingly supported on said supporting-means, sheaves on said arm, a cable carried about said sheaves, a tamping head mounted on one end of the cable within the silo, and mechanism connected operatively to said cable adapted to lift said tamping-head and release the same alternately.

6. In combination, removable supporting-means mounted on a silo-top, an arm movably connected to and supported by said means within the silo, sheaves on said arm adjustable therealong, a cable carried over said sheaves, a tamping-head mounted on an end of said cable within the silo, and mechanism connected operatively to said cable adapted to lift said tamping-head and release the same alternately.

7. In combination, supporting cross-bars mounted removably on the top edge of a silo, an annular tramway supported by said bars concentric with the silo, an arm rotatably mounted on said cross-bars concentrically with the silo, a trolley on said arm adapted to ride upon and be supported by said tramway, sheaves on said arm, a cable carried by said sheaves, a tamping-head suspended on one end of said cable within the silo, and mechanism without the silo adapted to move said cable to alternately lift and then release said tamping-head.

Signed at Waterloo, Iowa, this 20th day of Jan. 1916.

GEORGE WILLARD CISCO.
JOHN EDWARD HALL.

Copies of this patent may be obtained for five cents each, by addressing the "Commissioner of Patents, Washington, D. C."